Figures 1, 2:
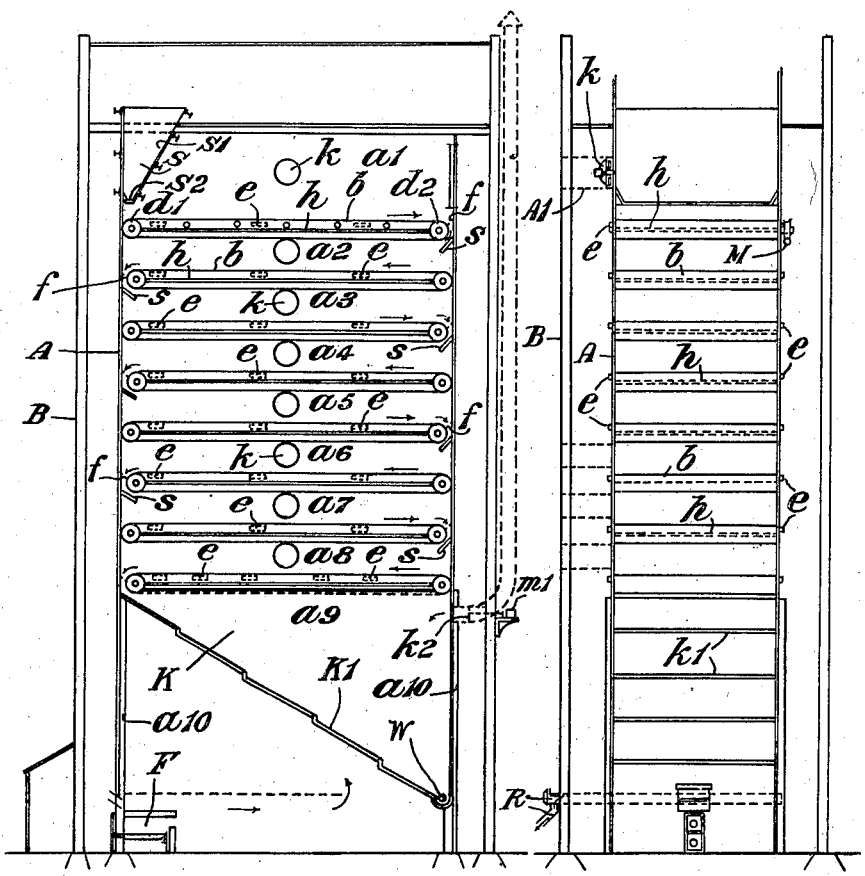

March 14, 1939.  H. J. H. KING  2,150,769

MALT HOUSE

Filed Aug. 4, 1936

Patented Mar. 14, 1939

2,150,769

UNITED STATES PATENT OFFICE 2,150,769

MALT HOUSE

Henry James Hubert King, Nailsworth, England

Application August 4, 1936, Serial No. 94,154
In Great Britain August 8, 1935

2 Claims. (Cl. 195—128)

This invention relates to the manufacture of malt and has for its object to expedite production in such manufacture and reduce overall expenses thereof.

The invention is particularly applicable to the manufacture of wheat malt, barley malt or malt of other cereal, and comprises improvements in such manufacture in which is combined the least amount of handling of the grain, and the least amount of damage to the malt, together with the least amount of manual attention required.

The present invention comprises an apparatus for malting having a germinating chamber in which is arranged a moving endless conveying floor or superposed series of floors, wherein each floor is arranged in a separate chamber having independent means of extracting air therefrom. The floors are moved at such a speed through the chamber that germination will be effected in the material carried by the floor or floors during the travel of the material under treatment through the apparatus.

A further feature of the invention consists of an apparatus for malting comprising a steeping tank, a superposed series of continuously movable germinating floors arranged above a drying or roasting kiln, the uppermost floors receiving steeped grain or maltable material from a steeping tank, and the germinating floors being in the form of endless bands each delivering the material under treatment to the floor beneath it while the lowermost floor delivers the germinated material to the drying or roasting kiln.

The apparatus is provided with a fan or other means for drawing away the air and moisture from the space above each band.

The apparatus whether germinating only or germinating combined with roasting comprises inner and outer chambers, the one forming a passage around the other, and such passage preferably contains the exhausting fans, each arranged in a shaft or passage extending through the wall of both chambers. The fans are motor driven or are driven from any suitable motor or from the power driving the endless bands.

The inner and outer chambers may be formed as a concrete building having at the top a grain store and a steeping tank the grain being dropped from the steeping tank through a water tight valve provided in the base thereof onto the uppermost member of the series of conveyor bands.

A manner of carrying out the invention is illustrated diagrammatically by the accompanying drawing in which Figure 1 is a sectional front elevation and Figure 2 a sectional side elevation of the apparatus and building.

In the drawing the apparatus is divided into a series of superposed chambers $a1$ to $a9$ and each of the sections $a1$ to $a8$ contains an endless band $b$ forming a germinating floor. The band may be formed of wire or gauze, canvas or rubber or any combination of the same and is perforated.

Each endless band $b$ is carried by drums $d1$ and $d2$ supported in bearings on joists extending across the chamber and at each delivery end of the band is a yieldable flap $f$ down which the material is discharged onto a slope $s$ which delivers the material well onto the band forming the floor below and which is driven in the opposite direction to the band above it. The flaps $f$ form a means of sealing the sections containing the floors.

Between the drums $d1$ and $d2$ is provided an independent floor $h$ extending horizontally from drum to drum.

The endless band floors may be driven slowly by worm gearing M at a speed so arranged that the germination of the grain will be completed at or before it reaches the discharge outlet from the lower floor.

Above the space above the uppermost malting floor is provided a floor for the maltable material and at the delivery end of this floor over the receiving end of the malting belt is provided a steeping tank S having an inclined base $S1$ which delivers the material through a water tight outlet $S2$ onto the receiving end of the uppermost endless belt.

Air and moisture are drawn away from the space above the floors by fans $k$.

The apparatus comprises inner and outer chambers A, B the space between the two walls of the same forming a passage, and extending into this passage are fans $k$, $k$ each arranged in a shaft or passage $A1$ and extending through such passage, that is through the walls of the inner and outer chamber. The fans $k$ may be motor driven or may be driven by endless bands from any suitable source of motive power. Although only one fan is shown there is one in each passage $A1$.

Air is drawn from the space between the inner and outer chambers A, B through a series of doors $e$ arranged in the walls of the inner chamber A above each floor $h$, and under the upper surface of the belts $b$, $b$.

The apparatus may be provided with eight or other suitable number of floors one above the other each driven at a suitable speed and each provided with an independent fan to produce air draught, and humidity atomizers may be provided to get the correct amount of damp air under each growing floor.

The grown malt from the floors is discharged over the end of the lower floor into a kiln K having an inclined floor K1 provided at its lower pointed portion with an extracting worm $w$ and a delivery spout R.

A suitable furnace F is provided for firing the kiln which may be provided with automatic heat regulators, and a chimney outlet in which may be provided an exhausting fan $k2$ driven by a motor $m1$. This furnace is provided with a wall of insulating material $a10$.

The endless belts $b$ may be driven from any other suitable source of power than the worm gearing M.

What I claim and desire to secure by Letters Patent is:

1. Apparatus for malting comprising a vertical malt house, a plurality of horizontal endless band conveyors located within said malt house one above the other in the manner of floors, and each adapted to convey the grain in one direction and drop it onto the conveyor next beneath whereby it is conveyed in the other direction and so on, each conveyor at its delivering end being spaced from the wall of the malt house to admit of the delivering of the grain onto the conveyor beneath, a pivoted element closing the space between said delivering end and wall while allowing passage of the grain, and means for passing individually controllable streams of air into contact with the grain on the respective conveyors.

2. Apparatus for malting comprising a vertical malt house, a plurality of permeable endless band conveyors located within said malt house one above the other in the manner of floors, and each adapted to convey the grain in one direction and drop it onto the conveyor next beneath whereby it is conveyed in the other direction and so on, each conveyor consisting of an endless band running on two drums, a horizontal partition located between the upper and the lower run of each conveyor and extending to the peripheries of the two drums of said conveyor, each conveyor at its delivering end being spaced from the wall of the malt house to admit of the delivery of the grain onto the conveyor beneath, a pivoted element closing the space between said delivering end and wall while allowing passage of the grain, and means for passing individually controllable streams of air through the chambers constituted by said partitions and pivoted elements, said means comprising inlet means and outlet means for each chamber, one of said means being in the wall of the malt house between the partition and the upper run of the conveyor, and the other of said means being in the wall of the malt house above the upper run of the conveyor.

HENRY J. H. KING.